(12) United States Patent
Franke et al.

(10) Patent No.: US 7,463,643 B2
(45) Date of Patent: Dec. 9, 2008

(54) APPLICATIONS OF A SWITCHED DATA NETWORK FOR REAL-TIME AND NON-REAL TIME COMMUNICATION

(75) Inventors: Michael Franke, Erlangen (DE); Martin Kiesel, Poxdorf (DE); Gernot Rossi, Simmelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 863 days.

(21) Appl. No.: 10/013,140

(22) Filed: Dec. 10, 2001

(65) Prior Publication Data
US 2002/0131451 A1 Sep. 19, 2002

(30) Foreign Application Priority Data
Mar. 16, 2001 (DE) .................. 101 13 398
Sep. 26, 2001 (DE) .................. 101 47 421

(51) Int. Cl.
*H04B 7/212* (2006.01)
(52) U.S. Cl. .............. 370/442; 370/458; 370/503
(58) Field of Classification Search ............... 370/351, 370/389, 392, 400, 428, 437, 442, 458, 503
See application file for complete search history.

(56) References Cited

U.S. PATENT DOCUMENTS

| | | | | |
|---|---|---|---|---|
| 5,590,116 A | * | 12/1996 | Zhang ..................... | 370/253 |
| 5,812,396 A | * | 9/1998 | Kato ........................ | 700/61 |
| 5,923,660 A | | 7/1999 | Shemla et al. ............ | 370/402 |
| 6,032,208 A | | 2/2000 | Nixon et al. .............. | 710/64 |
| 6,104,696 A | | 8/2000 | Kadambi et al. .......... | 370/218 |

(Continued)

FOREIGN PATENT DOCUMENTS

DE 197 10 971 A1 9/1998

(Continued)

OTHER PUBLICATIONS

IBC61491, EN 61491 Sercos Interface; Federal Republic of Germany.

(Continued)

*Primary Examiner*—Firmin Backer
*Assistant Examiner*—Jason Mattis
(74) *Attorney, Agent, or Firm*—Baker Botts L.L.P.

(57) ABSTRACT

The invention relates to a system and method for the control of a first station (2) in a switched data network (1) by a second station (9) in the switched data network (1), the communication between stations of the switched data network (1) taking place via one or more point-to-point connections in transmission cycles which are synchronous with one another; for the transmission of a reference value from a first station (2) of a switched data network (1) to a second station (9) of the switched data network (1), the communication between stations of the switched data network (1) taking place via one or more point-to-point connections in transmission cycles which are synchronous with one another; for the transmission of input values and output values between an input/output station (45) and a control unit (40) via a switched data network (1); for the transmission of a data telegram with applications data via a switched data network (1); and for the generation of a relative clock (68) in a station (58) of a switched data network (1).

9 Claims, 4 Drawing Sheets

U.S. PATENT DOCUMENTS

| | | | |
|---|---|---|---|
| 6,363,062 B1 * | 3/2002 | Aaronson et al. | 370/348 |
| 6,850,973 B1 * | 2/2005 | Larson et al. | 709/221 |
| 6,909,715 B1 * | 6/2005 | Denney et al. | 370/392 |

FOREIGN PATENT DOCUMENTS

| | | |
|---|---|---|
| DE | 197 58 203 A1 | 10/1998 |
| DE | 100 04 425 A1 | 1/2002 |
| DE | 100 58 524 A1 | 6/2002 |
| WO | WO 94/14255 | 6/1994 |
| WO | WO 99/67690 | 3/1999 |
| WO | WO 00/28400 | 5/2000 |
| WO | WO 01/05120 A1 | 1/2001 |

OTHER PUBLICATIONS

Teleoperating a Mobile Robot; a Solution Based on Java Language; F. Monteiro, P. rocha, P. Menezes, A. Silva, J. Dias; Departamento de Engenharia Electrotecnica; Instituto de Sistemas e Robotica; IEEE Catalog No. 97TH8280, 1997.

* cited by examiner

APPLICATIONS OF A SWITCHED DATA NETWORK FOR REAL-TIME AND NON-REAL TIME COMMUNICATION

FIELD OF THE INVENTION

The invention relates to applications of a switched data network which allows real-time and non-real-time communication within a transmission cycle. A network of this general type is disclosed in DE 19710971 A1.

BACKGROUND OF THE INVENTION

U.S. Pat. No. 5,923,660 discloses a switched Ethernet data network. Such a data network is based on what is known as a network switch, which can link various stations of the data network to one another by point-to-point connections. The communication on the data network takes place by means of data packets. A data packet can be sent to just one station, to a number of stations or to all the stations, of the data network, the term "broadcast" being used in the latter case.

A switched data network is generally characterized in that one station can reach all the other stations of the switched data network only indirectly by appropriately transferring the data to be transmitted by means of one or more switching units. The individual connections required for setting up a respective communication connection between, in each case, two stations of the data network are referred to as point-to-point connections.

Data networks make communication between a plurality of stations possible by networking, i.e., connection, of the individual stations to one another. Communication here means the transmission of data between the stations. The data to be transmitted is sent as data telegrams, i.e. the data is packed together to form a number of packets and is sent in this form to the respective receiver via the data network. The term data packets is therefore also used. The term transmission of data is used hereinbelow synonymously with the above-mentioned transmission of data telegrams or data packets.

The networking itself is achieved, for example, in switched high-performance data networks, in particular the Ethernet, by at least one switching unit being switched in each case between two stations and being connected to both stations. Each switching unit can be connected to more than two stations. Each station is connected to at least one switching unit, but not directly to another station. Stations are, for example, computers, stored-program controllers (SPS) or other machines which exchange electronic data with other machines, and in particular process such electronic data.

In distributed automation systems, for example in the field of drive engineering, specific data must arrive at specific times at the stations intended for said data and be processed by the receiving parties. The term used here is real-time-critical data or data traffic, since, if the data does not arrive at the right time at the intended destination, there are undesired results at the station. According to IEC 61491, EN61491 SERCOS interface—basic technical description (http://www.sercos.de/deutsch/index deutsch.htm), successful real-time-critical data traffic of the type mentioned can be ensured in distributed automation systems.

It is also known from the prior art to use a synchronous, clocked communication system with equidistance properties in such an automation system. This is understood to mean a system comprising at least two stations which are connected to one another via a data network for data to be exchanged or transmitted between them.

The exchange of data takes place cyclically in equidistant communication cycles which are predefined by the communication clock used by the system. Stations are, for example, central automation units, programming, planning and design or operator control units, peripherals such as input/output modules, drives, actuators, sensors, for example, stored-program controllers (SPS) or other control units, computers or machines which exchange electronic data with other machines, and in particular process data from other machines. Control units are understood to mean regulating units, drives or control units of all types. Bus systems such as Fieldbus, Profibus, Ethernet, Industrial Ethernet, FireWire or else PC-internal bus systems (PCI) etc. are used as data networks, for example.

Nowadays, automation components (for example controllers, drives, etc.), generally have an interface with a cyclically clocked communication system. An execution level of the automation component (Fast-cycle) (for example position control in a controller, rotational-speed control, torque control of a drive) is synchronized with the communication cycle. This defines the communication clock. Other, low-performance algorithms (Slow-cycle) (for example temperature controls) of the automation component can also communicate with other components (for example binary switches for ventilators, pumps, etc.), only by means of this communication clock although a slower cycle would be sufficient. Using only one communication clock for transmitting all the information in the system results in stringent requirements being placed on the bandwidth of the transmission link.

System components known from the prior art use only one communication system or one communication cycle (Fast-cycle) for the communication for each process level or automation level, all the relevant information being transmitted in the clock of said communication cycle. Data which is required only in the slow cycle can be transmitted in a sequenced fashion, for example by means of additional protocols, in order to restrict the requirements made of the bandwidth. This means additional software expenditure in the automation components. Furthermore, both the bus bandwidth and the minimum possible communication cycle in the entire system are determined by the component with the lowest performance.

DE 100 58 524.8 discloses a system and method for the parallel transmission of real-time-critical and non-real-time-critical data. Such a system has means for transmitting data in at least one transmission cycle with an adjustable period, each transmission cycle being divided into at least one first part for the transmission of real-time-critical data for real-time control, and at least one second part for the transmission of non-real-time-critical data.

For an application of such a system it is assumed that an open, Internetbased communication is a spontaneous communication, that is to say that both the time of such communication and the quantity of data that is generated and transferred cannot be determined in advance. As a result, collisions on the transmission lines in bus systems or in the switching units in switched high-speed networks, in particular Fast Ethernet or Switched Ethernet, cannot be ruled out.

So that the advantages of Internet communication technology can also be used in real-time communication in switched data networks in the field of automation engineering, in particular of drive engineering, a mixed operating mode of real-time communication with otherwise spontaneous, non-real-time-critical communication, in particular Internet communication, is desirable. This becomes possible by virtue of the fact that the real-time communication which occurs predominantly cyclically in the applications under consideration, and can thus be planned in advance, is strictly separated from the non-real-time-critical communication, in particular the open Internet-based communication, which, in contrast, cannot be planned.

The communication between the stations takes place in transmission cycles, each transmission cycle being divided into at least one first part for the transmission of real-time-critical data for real-time control, for example of the industrial equipment which is provided for this purpose, and at least one second part for the transmission of non-real-time-critical data, for example in the case of the open, Internet-capable communication. A particularly advantageous embodiment of such a system is characterized by the fact that each station is assigned a switching unit which is provided for transmitting and/or receiving and/or forwarding the data to be transmitted.

An advantageous embodiment of such a system is characterized by the fact that all the stations and switching units of the switched data network always have a common synchronous time base as a result of synchronization with one another. This is a precondition for separation of plannable real-time communication from non-plannable non-real-time-critical communication. The separation of plannable real-time communication and of non-plannable non-real-time-critical communication is ensured by applying the method for synchronization according to the non-prepublished application DE 10004425.5.

By permanently applying this method even in the ongoing operation of a distributed automation system, all the stations and switching units of the switched data network are always synchronized with a common time base, which consequently means that all the stations and switching units have the same starting point and the same length of each transmission cycle.

Since all the real-time-critical data transmissions are known before the actual data transmission as a result of the cyclical operation and can therefore be planned in advance, it is ensured that real-time communication can be controlled for all the stations and switching units in such a way that faults, for example collisions, do not occur in the transmission of data of the real-time-critical data telegrams themselves, and all the planned critical data transfer times are complied with precisely.

A further particularly advantageous embodiment of such a system is characterized by the fact that all the non-real-time-critical data which is intended to be transmitted during the part of a transmission cycle which is provided for the real-time-critical communication is buffered by the respective switching unit and is transmitted during the part of this transmission cycle, or of a following transmission cycle, which is provided for the non-real-time-critical communication. Accordingly, unplanned Internet communication which possibly occurs in the first part of a transmission cycle which is reserved for the real-time communication is displaced into the second part of the transmission cycle, which is reserved for the spontaneous, non-real-time-critical communication, as a result of which disruption to the real-time communication is completely avoided.

The respective data of the spontaneous, non-real-time critical communication is buffered by the respective switching unit in question and only transmitted in the second part of the transmission cycle, which is reserved for the spontaneous, non-real-time-critical communication, after the part for the real-time communication has expired. This second part, i.e. the entire period up to the end of the transmission cycle, is available to all the stations for the unplannable, non-real-time-critical communication, in particular Internet communication, likewise without influencing the real-time communication because the latter is carried out with separate timing.

Collisions with the real-time-critical data telegrams in the switching units can be avoided by virtue of the fact that all the non-real-time-critical data which cannot be transmitted during the part of a transmission cycle which is provided for the transmission of the non-real-time-critical data is buffered by the respective switching unit and transmitted during the part of a later transmission cycle which is provided for the transmission of the non-real-time-critical data.

A further advantageous embodiment of such a system is characterized in that, for all the real-time-critical data telegrams to be transmitted, transmission and reception times are noted by sensors and/or receivers, and all the times for the forwarding of the real-time-critical data telegrams and the respectively associated connecting links via which the real-time-critical data telegrams are forwarded, are noted in all the respectively involved switching units, before the start of the respective execution of the data transmission, i.e. a note of when and to which output port a real-time-critical data telegram which arrives at the time X is to be forwarded is noted in a switching unit.

A further advantageous embodiment of such a system is characterized by the fact that the forwarding times are planned in such a way that each real-time-critical data telegram arrives at the latest at the forwarding time, or arrives earlier at the respective switching unit, but in all cases is not transmitted onward until the forwarding time.

In this way, the problem of imprecise timing, which is manifest in particular in the case of long transmission chains, is eliminated. As a result, the real-time-critical data telegrams can be transmitted or forwarded immediately, without an interval, i.e. less satisfactory use of the bandwidth in the case of real-time data packets is avoided. Of course, it is, however, also possible when necessary to insert transmission pauses between the transmission of the individual data packets.

A further advantage of the time-based forwarding is that the finding of destinations in the switching unit is no longer address-based because the port to which the data is to be forwarded is apparent from the outset. The optimum use of all the existing connecting links within the switched data network is thus possible. Redundant connecting links of the switched data network which cannot be used for the address-based switching through of the non-real-time-critical communication, because circularities of data packets would otherwise occur, can, however, be taken into account in advance in the planning of the forwarding paths and thus used for the real-time communication.

This permits redundant network topologies, for example rings for fault-tolerant real-time systems, to be implemented. Data packets can be transmitted redundantly on disjunctive paths and circularities of data packets do not occur. A further advantage of planned forwarding is that it is thus possible to monitor each part of a path without acknowledge messages and fault diagnosis can thus easily be carried out.

A further advantageous embodiment of such a system is characterized by the fact that a switching unit has two separate access points to the respective station, one access point being provided for exchanging real-time-critical data and the other access point for exchanging non-real-time-critical data.

This has the advantage that real-time-critical data and non-real-time-critical data are processed separately. The access point for the non-real-time-critical data corresponds to the commercially available interface of a standard Ethernet controller, as a result of which the existing software, in particular drivers, can be used without restriction. The same applies to the existing software for a non-real-time-capable data network.

SUMMARY OF THE PRESENT INVENTION

The present invention is based on the discovery of applications of a switched data network which permits real-time communication and non-real time communication in a transmission cycle, in particular in a switched data network according to DE 100 58 524.8. Preferred applications are those in the field of automation equipment for production machinery (for example textile machines, packaging machines, plastic machines, wood/glass/ceramic machines, printing machines, lifting tools, machine tools, presses, robots etc.).

In a preferred embodiment of an application according to the invention, a station of a switched data network is controlled by a second station via the data network, whereby the control loop is closed via the switched data network. The real-time-capable part of the transmission cycles is utilized for the communication of actual values and set point values or of manipulated variables via the data network. Hence, the communication of the data telegrams which are necessary for the control takes place within determined time windows. Thus, the control takes place quickly, and oscillation effects are avoided. Such oscillation effects occur specifically in proposals known from the prior art for implementing a control loop via a data network when the transmission time between the stations of the data network can vary.

In another preferred embodiment of an application according to the invention, a reference value is transmitted via the switched data network. Such a reference value is generated in this context by one of the stations of the data network for one or more other stations of the data network. This can take the form, for example, of the acquisition of an actual value of an axle, i.e., a master axle of a piece of equipment. On the basis of this actual value, the respective station generates a reference value which is used for controlling slave axles. Such a reference value is transmitted to the respective stations of the switched data network which control the slave axles. It is particularly desirable for the transmission of a data telegram with the reference value to take place in the real-time-capable part of a transmission cycle so that the time necessary for the transmission of the data telegram is determined. Control is understood to be, for example, a stored-program control, a motion controller or a numerical controller. The functionality of such a control can also be integrated in a drive.

A further advantage with this embodiment is that the actual values can also be acquired synchronized with the communication cycles. This ensures that the actual values take place at all the axles essentially at the same time, which is brought about by the synchronization of the communication cycles. This is an essential advantage particularly in synchronous applications.

A further preferred embodiment of an application of the present invention relates to the coupling of an input/output station to a control unit. In the case of control units, particularly stored-program controllers (SPS), it is generally customary to implement the input/output functionality in a separate station. According to the present invention, the input/output station is coupled directly to the control unit via the switched data network. The respective data telegrams are transmitted here in the real-time-capable part of the transmission cycle.

A further preferred embodiment of an application of the present invention relates to the transmission of data telegrams with applications data via a switched data network. For this purpose, the data network can be planned and designed in such a way that it is possible to transmit a respective data telegram within a defined time window after an application request. An application in a control component can be embodied, for example, by appropriate parameterization or switching of component functionality (for example parameterization of a drive and thus applicative embodiment of a technological function contained therein). Another possible way of embodying an application can be an automation component which can be programmed by the user. The applicative embodiment is achieved here by means of an appropriate loadable user program. All aspects such as drives, motion controllers, SPS, numerical controllers are again conceivable here as programmable automation components.

The use of the communication functionality from the application can be, depending on the embodiment, a mapping of parameters onto the communication channel (in the case of purely parameterized, non-programmable components);

a mapping of variables of the user program (in the case of programmable components) onto the communication channel; and a mapping of automation components of immanent communication connections (for example synchronous connections from a control axle/control sensor to a following axle).

An application example for the transmission of applications data by means of a data telegram in a part of a transmission cycle for the real-time communication is the transmission of an emergency off command (for example by distributing a variable of the user program) to various stations of the switched data network. For the transmission of such a data telegram it is essential that it is received at each of the respective stations within a predefined maximum time period.

A further preferred embodiment of an application according to the invention relates to the generation of a relative clock in one of the stations. The relative clock is generated by a master clock and distributed cyclically in the network, and ensures that all the stations involved in the data network have a synchronized clock time. The time base for the relative clock is provided here by means of the synchronous transmission cycles and/or the division of the transmission cycles into time slots. Events can be registered with time stamps on the basis of this common clock time (for example edge detection of digital I/Os) or switching operations (for example switching of digital/analog outputs) with a corresponding time stamp, and the switching output can be carried out on the basis of this common relative time.

In yet another preferred embodiment of an application according to the invention, the switched data network, and in particular the part of the transmission cycle for the non-real-time-critical communication is used for a data transmission by means of an Internet protocol, in particular by means of the TCP/IP protocol. For example, a user can set up a machine, maintain it, perform diagnosis on it and set machine parameters and carry out software upgrades for it, and the like, via a TCP/IP connection. In addition, it is also possible to implement what are referred to as Remote Procedure Calls (RPC). Here, specific data is interrogated from, for example, a data server of one of the stations of the switched data network by another station and/or user, for example with respect to the setting of machine parameters, operating instructions or the interrogation of recipes for an injection molding machine.

BRIEF DESCRIPTION OF THE DRAWING

Preferred embodiments of the invention are disclosed in greater detail below with reference to the drawings, in which.

DETAILED DESCRIPTION OF THE INVENTION

Figure 1:
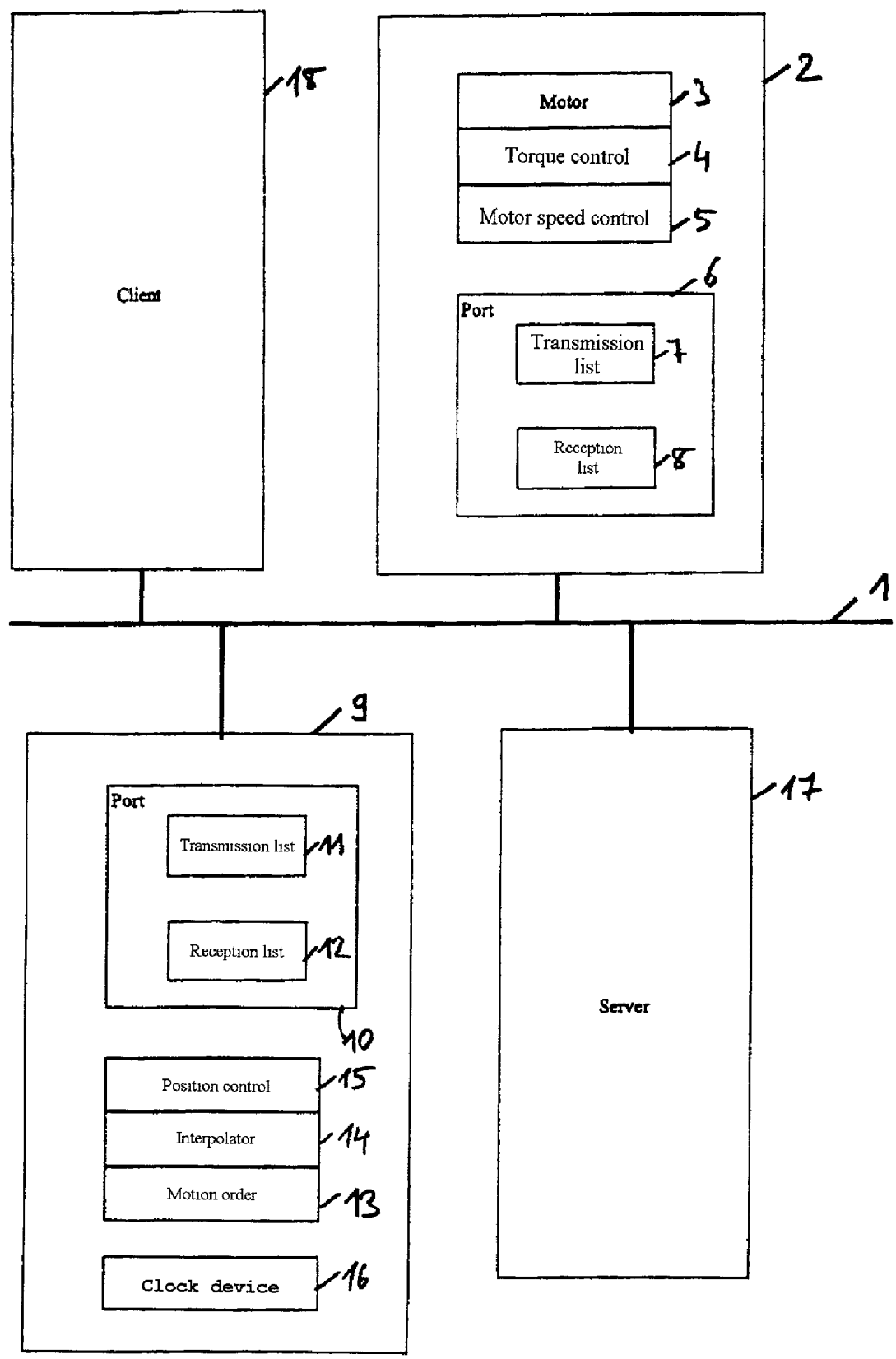
FIG. 1 shows a block diagram of an embodiment of a system according to the invention for closing a control loop via a switched data network.

FIG. 1 shows an embodiment of an automation system according to the invention with a switched data network 1. The communication between stations of the switched data network takes place via one or more point-to-point connections in transmission cycles which are synchronous with one another. Each of the transmission cycles has a first part for the transmission of real-time-critical data, and a second part for the transmission of non-real-time-critical data. The real-time-critical data is transmitted in a deterministic fashion, that is to say within the scope of an individually planned communication. The transmission of the non-real-time-critical data takes place in a nondeterministic fashion and without the possibility of previous precise planning.

The transmission of data in a non-real-time-critical part typically takes place if a particular request, for example from a user, is to be fulfilled. An Internet protocol, in particular TCP/IP, is preferably used here for the transmission of the non-realtime-critical data in the respective part of the transmission cycle. This has the advantage that it is possible to resort to the available Internet technology and the corresponding equipment components and software programs, in particular browser programs.

The data network 1 can also be scaled, that is to say the length of the various transmission cycles between stations of the data network 1 can have a different length defined, for example, by means of planning and design measures. However, the chronological lengths of the transmission cycles must be an integral multiple of one another and be synchronous with one another.

Different transmission rates for different point-to-point connections can also be selected. This makes it possible to implement different "Quality of Services" (with different baud rates, for example).

In the system in FIG. 1, a drive 2 for controlling a motor 3 is connected to the data network 1. The drive 2 contains a torque controller 4 and a motor speed controller 5 for the motor 3. The torque controller 4 and the motor speed controller 5 are cascaded. Interpolation, position control, motor speed control and torque control are cascaded, operate in a clocked fashion, and are synchronized with one another.

For communication via the data network 1, the drive 2 also has a port 6. The port 6 has a transmission list 7 and a reception list 8 for real-time communication. For example, the transmission list 7 specifies in which transmission cycle which data telegram is to be transmitted to which address from the port 6. The reception list 8 specifies the reception of data telegrams by other stations of the system in a corresponding fashion. The transmission list 7 and the reception list 8 therefore relate to the deterministic and real-time-critical part of the communication which takes place in one part of each transmission cycle, but not to the other part of the transmission cycle for the non-real-time-critical communication via TCP/IP.

In addition, a control unit 9 is connected to the data network 1. The control unit 9 has a port 10 with a transmission list 11 and a reception list 12, corresponding to the port 6 with the transmission list 7 and the reception list 8. The control unit 9 has a module 13 for inputting and/or generating a motion order for a specific unit which is driven by the motor 3. This unit can be, for example, a robot's arm. In addition, the control unit 9 has an interpolator 14. The interpolator determines the necessary movement sequence from a motion order in order to move from the actual position to the set point position. The control unit 9 also has a position control 15 for the specific positioning at a particular location. The position control 15 and/or the interpolator 14 can optionally also be implemented in the drive 2. The motor speed controller 5 can correspondingly also be implemented in the control unit 9. Further, the control unit 9 has a clock device 16. The clock device 16 forms the time base for the system in FIG. 1. The clock device generates data telegrams for each of the stations of the data network 1 with data which specifies the time base of the clock device 16 at the reception time at the respective station. As a result, the individual local time bases in the stations are synchronized with the time base of the clock device 16.

Automation components 17 and 18 are connected to the data network 1. The automation component 17 contains a data server. A wide variety of files, for example user information, technical documentation, operating instructions, work instructions, maintenance schedules, machine parameters, production plans, recipes for the manufacture of plastic injection molded parts etc. can be stored in the data server.

The automation component 18 has the function of a client which, depending on the requirements placed on the automation component 17, has access to specific data stored there. The automation component 18 can be, for example, an operator console with an Internet browser or else any other desired automation component, for example programming units, planning and design units, peripherals such as input/output modules, actuators, sensors, drives, controllers, stored-program controllers (SPS), for example, or other control units, computers or machines which exchange electronic data with other machines. Control units are understood here to be closed-loop or open-loop control units of all types.

When the system in FIG. 1 operates, the drive 2 acquires a specific actual value relating to the control of the motor 3. The acquisition of this actual value can preferably take place here in clock-synchronized fashion with the transmission cycles on the data network 1, that is to say the acquisition takes place at a precisely determined time.

The actual value which is acquired in this way is then transmitted to the control unit 9 via the data network 1 in accordance with the transmission list 7 of the port 6 by means of a data telegram in the real-time-capable part of the respective transmission cycle. The data telegram is received at said control unit 9 at the port 10 in accordance with the reception list 12. The position control 15 generates a set point value for the control of the motor 3. The generation of such a set point value can also take place in a clock-synchronized fashion with the transmission cycles on the data network 1, with the result that the set point value is also generated at a time which is respectively determined in advance.

A control error is determined from the actual value received from the control unit 9 via the data network 1 and the set point value of the position control 15. This control error is used to form a manipulated variable in the position control 15. This manipulated variable is then transmitted from the control unit 9 to the drive 2 in a data telegram in accordance with the transmission list 11 during the transmission of a realtime-capable part of the respective transmission cycle. The reception in the drive 2 takes place in turn in accordance with the reception list 8. The motor 3 is then correspondingly adjusted on the basis of the received manipulated variable.

This process of the acquisition of an actual value, the transmission of the actual value via the data network 1, the generation of a manipulated variable in the control unit 9, the transmission of the manipulated variable via the data network 1 and the adjustment in accordance with the manipulated variable in the drive 2 is carried out continuously on the basis of the deterministic communication via the data network 1. A rapid control can be implemented on the basis of this deterministic communication. At the same time, unpredictable oscillation effects are thus prevented as they begin so that the communication takes place deterministically. At the same time as this control via the data network 1, it is possible, for example, for the automation component 18 to access the server 17 in order to carry out a database interrogation. The data resulting from this database interrogation can also be transmitted via the data network during the continuous real-time-critical communication for the control, in that the second part in the transmission cycle is used for this non-real-time-critical communication. The client functionality in 18 and/or the server functionality in 17 can also be implemented in any desired automation component (for example in the controller or in the drive).

Figure 2:
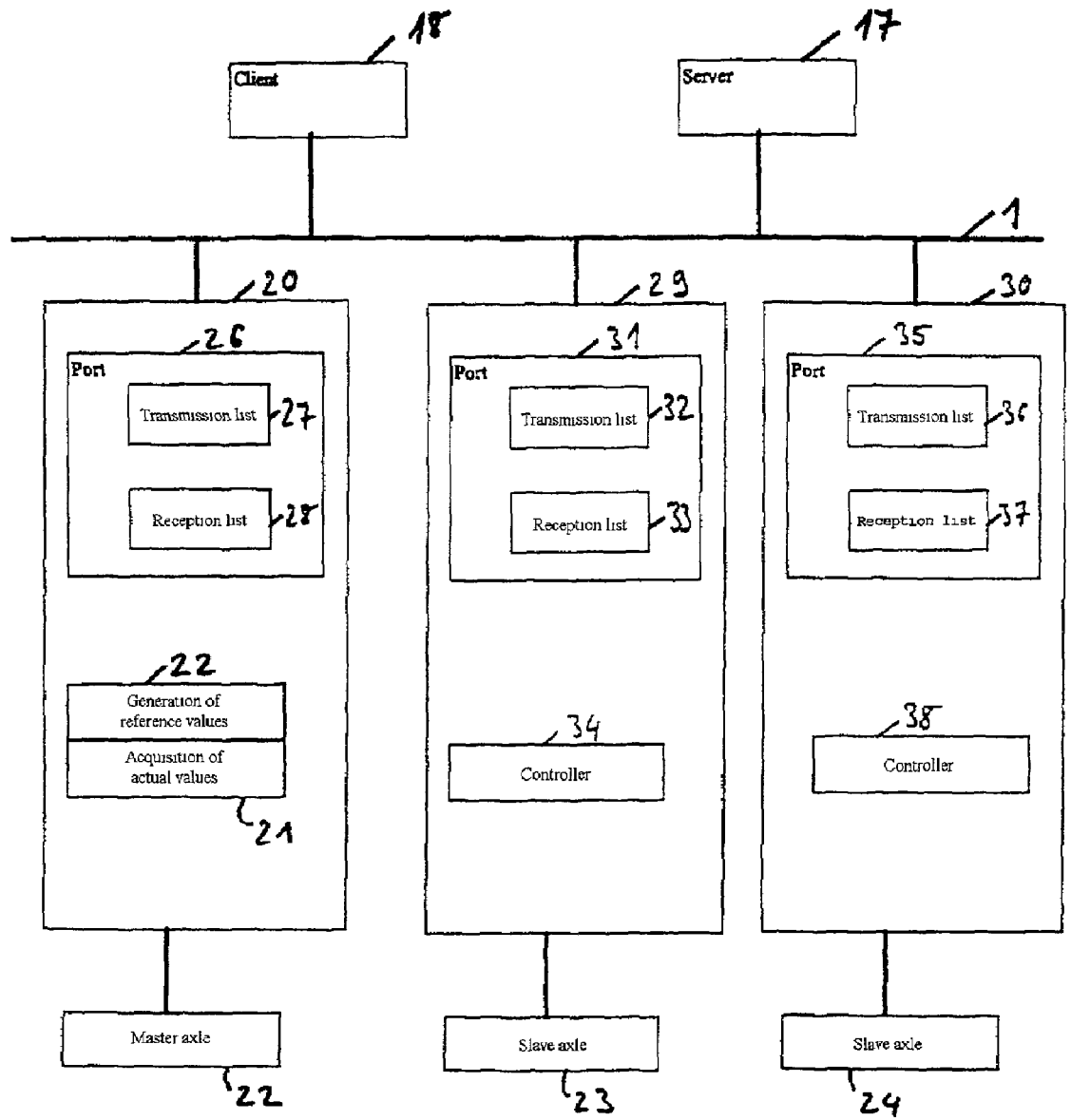
FIG. 2 shows a further embodiment of a system according to the invention for transmitting reference values in a synchro-controller.

FIG. 2 shows a block diagram of a system according to the invention having an application relating to the transmission of a reference value. Elements in FIG. 2 which correspond to elements in FIG. 1 are provided with the same reference symbols here.

In the system in FIG. 2, a controller 20 is connected to the data network 1. As an alternative to the controller 20, it is also possible to provide a sensor. The controller 20 has a component 21 for the acquisition of the actual value of the position and/or rotational speed of a master axle 22 which is part of a system with a plurality of further axles, in particular the slave axles 23 and 24. The master axle 22 which is referred to in this way forms the reference for the slave axles 23 and 24, i.e., the slave axles 23 and 24 each follow the movement of the master axle with a linear (for example gear mechanism) or non-linear (for example cam disk) relationship with the master axle. The slave axle follows the master axle in accordance with the corresponding relationship with the smallest possible offset. Such an application is also referred to as synchro-control. The reference value can be a real axle (as in the present exemplary embodiment), a virtual axle (only calculated), a value derived from a sensor signal or a value predefined as a time function.

A reference value for the slave axles 23 and 24 is generated in the component 22 of the controller 20 from the acquisition of actual values of the master axle 22 in the component 21. This reference value is transmitted as part of a data telegram from the port 26 via the data network 1 in a determined transmission cycle in accordance with the transmission list 27. This data telegram is preferably directed to the two controllers 29 and 30 of the slave axles 23 and 24.

The controller 29 has a port 31 with a transmission list 32 and a reception list 33. At the port 31, the controller 29 therefore receives the data telegram with the reference value from the controller 20 in accordance with the reception list 33 in a determined transmission cycle. This reference value is evaluated by the control module 34 of the controller 29 for corresponding control of the slave axle 23. The movement of the slave axle 23 is executed with a specific position relationship with the master axle (for example linear or non-linear position relationship between master and slave axles).

The controller 30 which also receives the data telegram with the reference value at its port 35 with the transmission list 36 and the reception list 37, also behaves in a corresponding way. This is evaluated in the control module 38 in a corresponding way for the control of the slave axle 24.

The data telegrams with the reference value are transmitted by the controller 20 within predefined time intervals in the real-time-capable parts of the respective transmission cycles. At the same time, and independently of this reference value control, a client-server communication can take place between the automation components 17 and 18 via the data network 1, as has already been explained with reference to FIG. 1. The client functionality or server functionality can also be integrated in the controllers or other automation components in this application.

Figure 3:
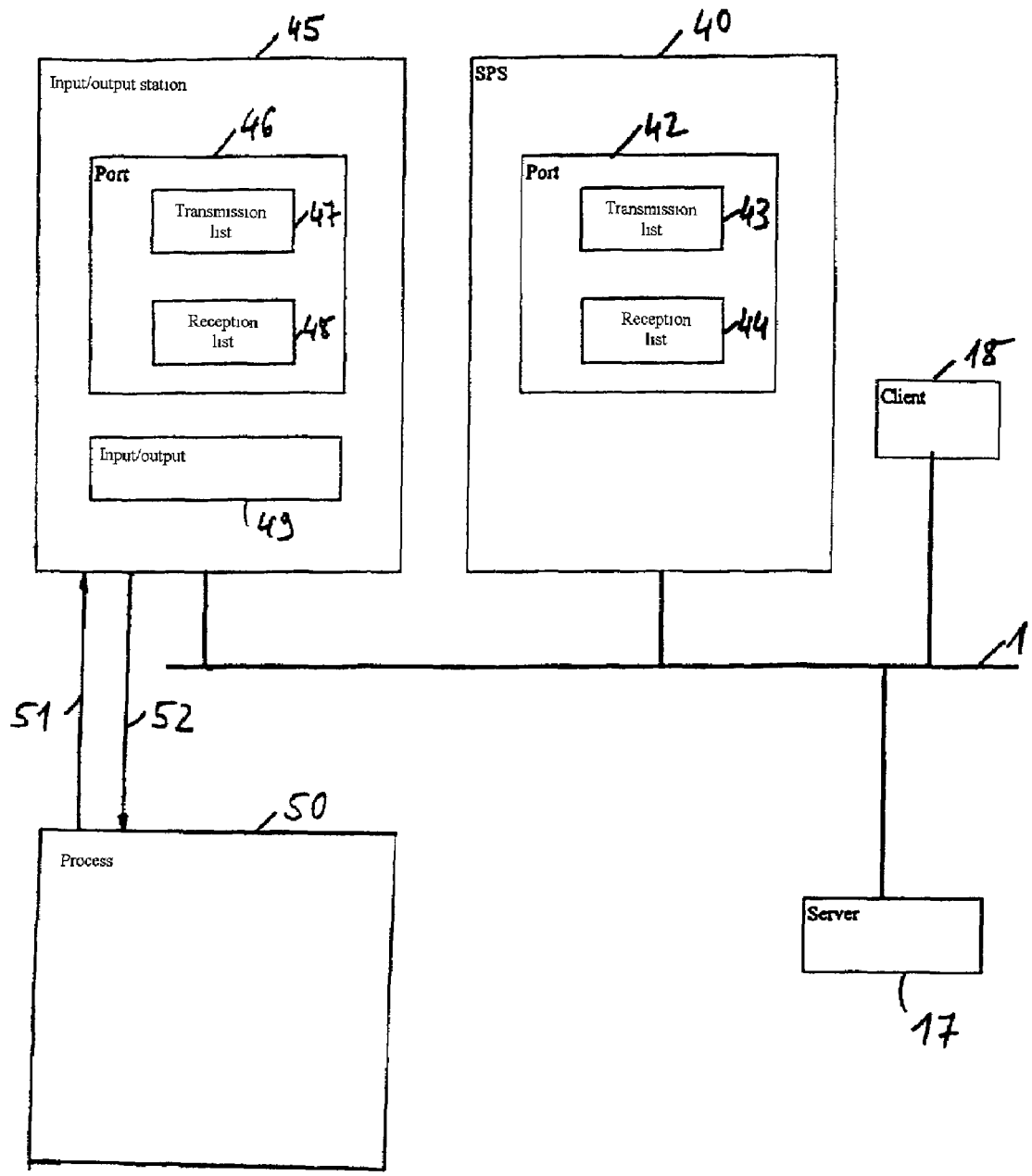
FIG. 3 shows a further embodiment of a system according to the invention relating to the coupling of an input/output station to a control unit via a switched data network.

FIG. 3 shows a further application example relating to the rapid connection of an input/output station to a controller, for example a stored-program controller (SPS), a motion controller or a numerical controller. The functionality of such a controller can also be integrated in a drive. Elements in FIG. 3 which correspond to elements in FIG. 1 or in FIG. 2 are in turn provided with the same reference symbols.

The system in FIG. 3 has a controller 40 with a port 42. The port 42 has in turn a transmission list 43 and a reception list 44 for the deterministic communication via the data network 1. In addition, an input/output station 45 is connected to the data network 1. The input/output station 45 contains a port 46, in turn with a transmission list 47 and a reception list 48. The input/output station also contains an input/output module 49.

In each of the stations of the data network 1, the communication via the data network 1 is in turn carried out deterministically, specifically during the parts of the respective transmission cycles provided for the transmission of real-time data, on the basis of the transmission and reception lists. This fact is utilized for the coupling of the input/output station 45 to the stored-program controller 40. Data telegrams received via the port 46 are registered by automation components in the input/output module 49 of the input/output station 45. In addition, process values from the process 50 are acquired by means of the module 49. For this purpose, the module 49 receives actual values via the line 51 from sensors which sense the process 50.

The corresponding data is transmitted from the module 49 by the input/output station 45 to the stored-program controller 40 by means of further data telegrams and processed at said controller 40. The data resulting from this processing is then in turn transmitted by the controller 40 to the input/output station 45 or its input/output module 49 and is then forwarded to the respective automation components from there. This takes place, for example, via the line 52 to automation components of the process 50. In parallel, and independently of this, a client-server connection for non-real-time-critical data can in turn be made via the data network 1.

Figure 4:
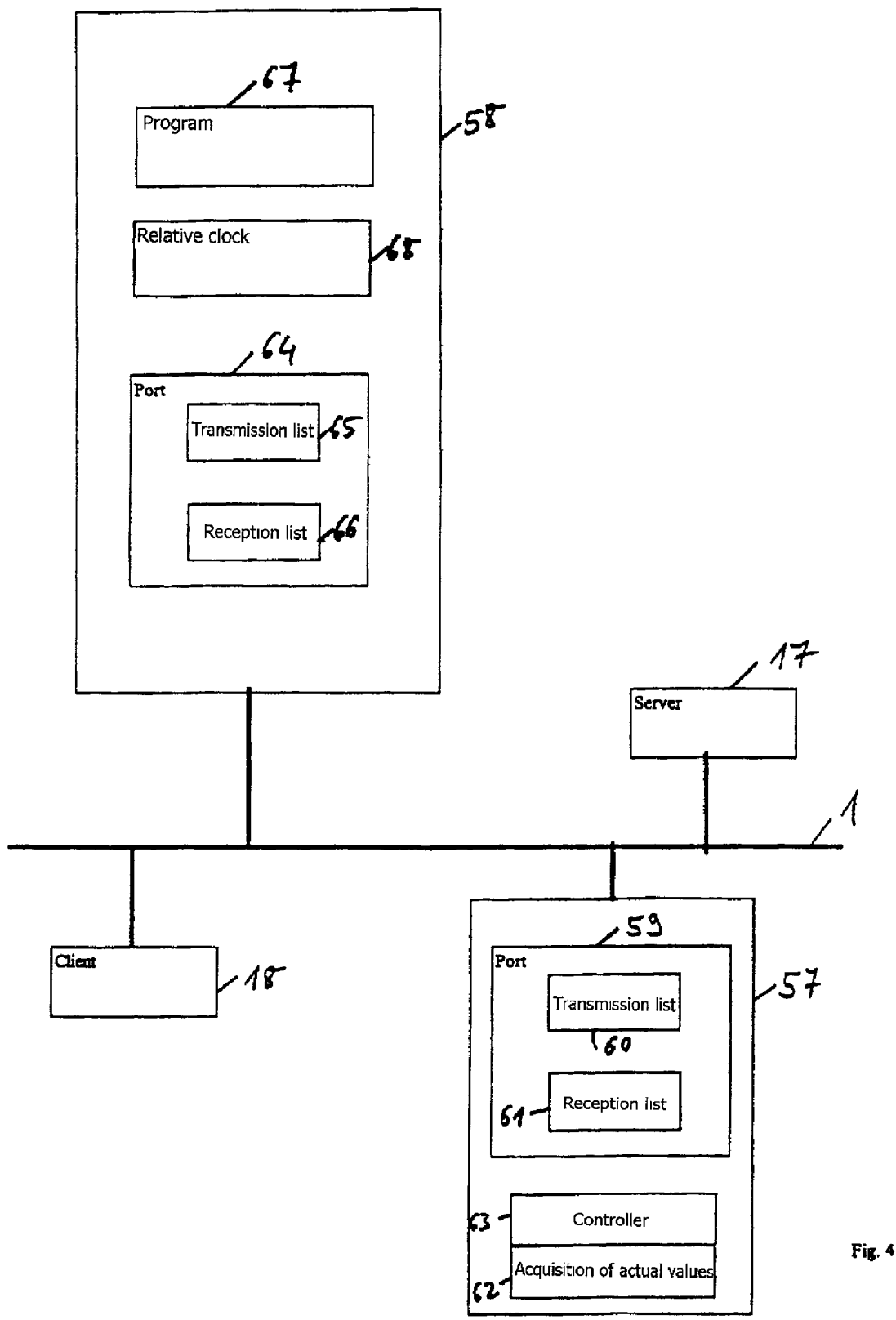
FIG. 4 shows a further embodiment of a system according to the invention for implementing a relative clock in one of the stations of a switched data network and for the implementation of the precise detection of inputs or of precise switching of outputs on the basis of this relative clock.

FIG. 4 shows a block diagram relating to a further application for the generation of a master relative clock in one of the stations of the data network 1. Elements of the system in FIG. 4, which correspond to elements in FIGS. 1, 2 and/or 3, are in turn provided with the same reference symbols.

The system in FIG. 4 contains various automation components, specifically the input/output unit 57 and the controller 58. The input/output unit 57 has a port 59 with a transmission list 60 and a reception list 61. In addition, the input/output unit 57 contains an output component 62 and an input component 63.

The automation component (for example a programmable controller) 58 has a port 64 with a transmission list 65 and a reception list 66. In addition, the controller 58 has a program 67 and a relative clock 68 for generating a relative time base. The controller 58 makes the time information of the relative clock 68 in the data network 1 available cyclically by transmitting data telegrams. Events (for example switching events of inputs) in an input/output unit 57 can be provided with a time stamp derived from the relative clock information and transmitted to the controller 58 via the data network. This chronological event information can be used further in the controller 58 by the control system or by an appropriate user program.

Switching events with a time stamp (based on the relative clock) can be generated in the automation component 58 (via the control system or user program) and transmitted via the data network to the input/output unit 57. In the input/output unit 57, these switching events can then be executed at the correct time (based on the time stamps).

Here too, it is the case that a client-server communication can take place via the data network 1 in parallel with and independently of the real-time-critical data telegrams in order to trigger the relative clock 68.

The present invention therefore permits, on the basis of the data network 1, a multiplicity of applications from the fields of automation equipment for production machines (for example textile machines, packing machines, plastics machines, wood/glass/ceramics machines, printing machines, lifting mechanisms, machine tools, presses, robots) such as:

Clock synchronization of communication stations with a precision of <=1 µs;
Closing of control loops via the bus;
Synchronized actual value acquisition and set point value outputting relating to all the communication stations (controllers, drives, I/O stations);
Transmission of reference values for synchronous applications;
Deterministic transmission of applications data for, for example, emergency off facility;
Hard real-time communication for aforesaid applications in conjunction with acyclical communication or standard Internet communication; and
Hard real-time communication in conjunction with RPC mechanisms via the same communication system (Ethernet) on the basis of the Ethernet.

According to the invention, not only are the following:
clock synchronization
real-time communication with the typical applications
reference value coupling
closing of control loops via a bus
synchronous acquisition of actual values, inputs, sensors
synchronous control and switching of outputs, actuators
fast I/O,
acyclical communication
   via proprietary protocols,
   via standard protocols (for example Internet protocols) with web server in an RT (real-time) Ethernet network component
and RPC
   with client/server functionality in a network component implemented via a communication connection on the basis of the real-time Ethernet, but also the application of the communication connection between the automation components of textile machines, packing machines, plastics machines, wood/glass/ceramics machines, printing machines, lifting mechanisms, machine tools, presses, robots.

Within real-time communication there are potentially a plurality of communication cycles in order to implement "quality of services", for example:
1 ms cycle:
synchronous connection (reference value via a bus)
rotational speed set point/position set point/IPO interface for time-critical axles
fast I/O coupling
4 ms cycle:
time non-critical axles (frequency converter, simple positioning axles)
applications data, for example:
   emergency off control
   distributed shift register (product tracing)
   actuation (for example modes of operation) in distributed systems
   description of new drilling orders (for example drilling depth) for automatic drilling machines
asynchronous and/or event-controlled cycle:
   planning and design data and events
   data and routines for fault handling and diagnostics
finer system scaling is possible with these various communication cycles.

In summary, the invention relates to a system and method for the control of a first station in a switched data network by a second station in the switched data network, the communication between stations of the switched data network taking place via one or more point-to-point connections in transmission cycles which are synchronous with one another; for the transmission of a reference value from a first station of a switched data network to a second station of the switched data network, the communication between stations of the switched data network taking place via one or more point-to-point connections in transmission cycles which are synchronous with one another; for the transmission of input values and output values between an input/output station and a control unit via a switched data network; for the transmission of a data telegram with applications data via a switched data network; for the generation of a relative clock in a station of a switched data network.

We claim:

1. A method for control of a first station in a switched data network by a second station in the switched data network,
wherein communication between the stations takes place via at least one point-to-point connection in transmission cycles which are synchronous with one another, said transmission cycles being divided into a first part for the transmission of real-time-critical data and a second part for the transmission of non real-time-critical data,
the method comprising: specifying for the transmission of real-time critical data within each station a transmission list and a reception list for a deterministic communication;
determining by the first station of an actual value generated within the first station; transmitting a first data telegram with the actual value from the first station to the second station via the switched data network in the first part of a transmission cycle;
determining a control error from the actual value and a set point value of the second station within the second station, and
determining a manipulated variable from the control error by the second station; and transmitting a second data telegram from the second station to the first station in the first part of a subsequent transmission cycle with the manipulated variable, wherein for said first and second data telegram it is specified in one of said transmission lists in which transmission cycle the data telegram is to be transmitted.

2. The method according to claim 1, further comprising the acquisition of at least one of the actual values taking place in synchronism with the communication cycles.

3. The method according to claim 1, wherein said first station controls a first axle, the method further comprising processing by the first station of a reference value based on said actual value for control of a second axle in a third station based on a position and/or rotational speed of said first axle;

transmission of a data telegram with the reference value in the first part of a transmission cycle from the first station to the third station; and transfer of the reference value in the third station and execution of a linear or non-linear movement related thereto.

4. The method according to claim 3, further comprising generating reference values in the first station via a controller with a master axle, a controller with a timing function, and/or a reference value sensor, and/or a drive, and wherein the third station has a controller or a drive for one or more slave axles based on the reference value.

5. A method for clock-synchronized control of a first station in a switched data network by a second station of the switched data network, wherein communication between the stations of the switched data network takes place via one or more point-to-point connection in transmission cycles which are synchronous with one another, said transmission cycles being divided into a first part for the transmission of real-time-critical data and a second part for the transmission of non real-time-critical data, the method comprising the steps of:

specifying for the transmission of real-time critical data within each station a transmission list and a reception list for a deterministic communication;

acquisition of one or more actual values by the first station in synchronism with the communication cycles;

transmitting a first data telegram with the actual value or values from the first station to the second station via the switched data network in the first part of a transmission cycle;

determining a control error from the actual value or values and a set point value of the second station within the second station, and determining a manipulated variable from the control error by the second station; and transmitting a second data telegram from the second station to the first station in the first part of a subsequent transmission cycle with the manipulated variable;

wherein for said first and second data telegram it is specified in one of said transmission lists, respectively in which transmission cycle the data telegram is to be transmitted.

6. The method according to claim 5, wherein a reference value is determined for a third station based on the actual value, after the actual value is acquired by the first station, a data telegram with the reference value in the first part of a transmission cycle is transmitted from the first station to the third station, and the reference value is transferred in the third station and a movement related to the reference value is executed, it being possible for the course of the movement to be linear or non-linear.

7. A method according to claim 6, wherein the first station comprises:

a controller with a master axle, and/or a controller with a timing function and/or a reference value sensor and/or a drive, for the generation of reference values, and the third station comprises a controller or a drive for one or more slave axles.

8. A method according to claim 5, wherein the second part of the transmission cycle for the transmission of non-real-time-critical data takes place according to an Internet protocol.

9. A method according to claim 5, wherein the non-real-time-critical data is data relating to activation and/or maintenance of a piece of equipment.

* * * * *